United States Patent
Mondjak et al.

(10) Patent No.: US 9,424,620 B2
(45) Date of Patent: Aug. 23, 2016

(54) IDENTIFICATION OF GPU PHASE TO DETERMINE GPU SCALABILITY DURING RUNTIME

(71) Applicant: Intel Corporation, Santa Clara, CA (US)

(72) Inventors: Idan Mondjak, Kfar Saba (IL); Supratik Majumder, Bangalore (IN); Eyal Yaacoby, Haifa (IL)

(73) Assignee: Intel Corporation, Santa Clara, CA (US)

( * ) Notice: Subject to any disclaimer, the term of this patent is extended or adjusted under 35 U.S.C. 154(b) by 245 days.

(21) Appl. No.: 13/730,908

(22) Filed: Dec. 29, 2012

(65) Prior Publication Data

US 2014/0184620 A1    Jul. 3, 2014

(51) Int. Cl.
*G06T 1/20*    (2006.01)
*G06F 1/32*    (2006.01)
*G09G 5/36*    (2006.01)

(52) U.S. Cl.
CPC . *G06T 1/20* (2013.01); *G06F 1/324* (2013.01); *G06F 1/325* (2013.01); *G06F 1/3206* (2013.01); *G09G 5/363* (2013.01); *G09G 2330/021* (2013.01); *G09G 2360/08* (2013.01); *G09G 2360/121* (2013.01); *Y02B 60/1217* (2013.01)

(58) Field of Classification Search
None
See application file for complete search history.

(56) References Cited

U.S. PATENT DOCUMENTS

| | | | |
|---|---|---|---|
| 6,938,176 B1* | 8/2005 | Alben et al. | 713/323 |
| 7,111,179 B1* | 9/2006 | Girson et al. | 713/300 |
| 7,590,825 B2 | 9/2009 | Krimer et al. | |
| 7,778,800 B2 | 8/2010 | Aguaviva et al. | |
| 7,882,369 B1* | 2/2011 | Kelleher et al. | 713/300 |
| 7,950,003 B1 | 5/2011 | Duca et al. | |
| 8,161,312 B2* | 4/2012 | Cai et al. | 713/500 |
| 8,200,796 B1 | 6/2012 | Margulis | |
| 8,284,207 B2 | 10/2012 | Bakalash et al. | |
| 8,549,263 B2 | 10/2013 | Krimer et al. | |
| 8,812,823 B2 | 8/2014 | Krimer et al. | |
| 2002/0087901 A1* | 7/2002 | Cooper et al. | 713/320 |
| 2003/0222876 A1* | 12/2003 | Giemborek et al. | 345/503 |
| 2006/0123252 A1* | 6/2006 | Vaidya et al. | 713/300 |
| 2009/0096797 A1* | 4/2009 | Du et al. | 345/506 |
| 2009/0309885 A1* | 12/2009 | Samson et al. | 345/519 |
| 2010/0017636 A1* | 1/2010 | Hashimoto et al. | 713/322 |
| 2011/0060924 A1* | 3/2011 | Khodorkovsky | 713/300 |
| 2013/0061064 A1 | 3/2013 | Ananthakrishnan et al. | |

OTHER PUBLICATIONS

PCT/US2013/046165 Notification Concerning Transmittal of International Preliminary Report on Patentability, mailed Jul. 9, 2015, 6 pages.
PCT/US2013/046165 Notification of Transmittal of the International Search Report and the Written Opinion of the International Searching Authority, Mailed Aug. 28, 2013, 11 pages.

* cited by examiner

*Primary Examiner* — Barry Drennan
*Assistant Examiner* — Jason Pringle-Parker
(74) *Attorney, Agent, or Firm* — Nicholson De Vos Webster & Elliot, LLP (57) ABSTRACT

A method performed by a processor is described. The method may include identifying a graphics processing unit (GPU) phase of a frame, using said identified GPU phase to obtain frequency scalability information for said identified GPU phase, and determining whether to change a frequency at which a GPU is to draw said frame within said phase based on said frequency scalability information.

22 Claims, 10 Drawing Sheets

IDENTIFICATION OF GPU PHASE TO DETERMINE GPU SCALABILITY DURING RUNTIME

FIELD OF INVENTION

The field of invention relates generally to the computing sciences, and, more specifically, to the identification of GPU phase to determine GPU scalability during runtime.

BACKGROUND

Figure 1:
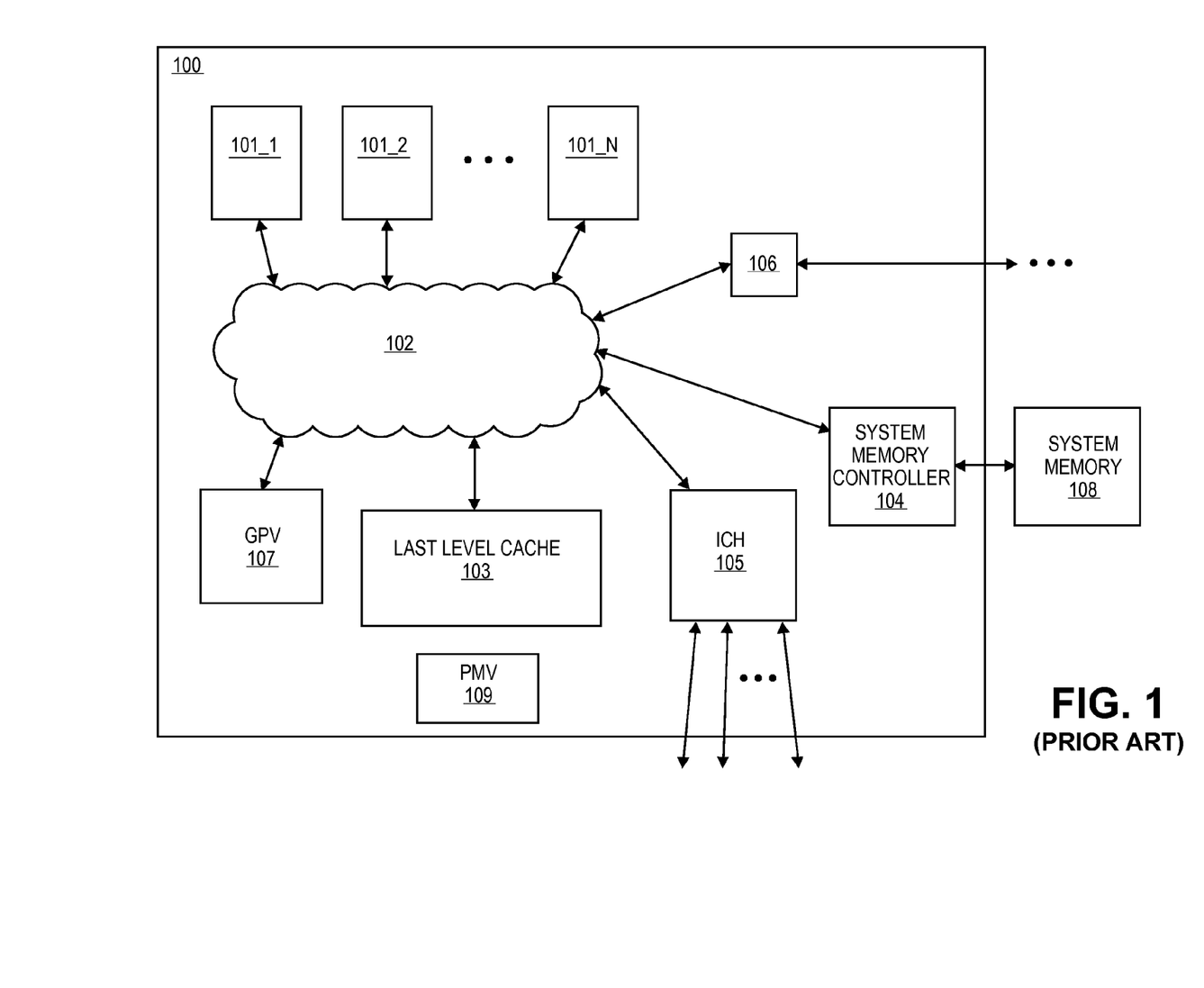
FIG. 1 shows an exemplary processor.

FIG. 1 shows the architecture of a multi-core processor 100 within a computing system. As observed in FIG. 1, the processor includes: 1) multiple processing cores 101_1 to 101_N; 2) an interconnection network 102; 3) a last level caching system 103; 4) a memory controller 104 and an I/O hub 105. Each of the processing cores contain one or more instruction execution pipelines for executing program code instructions such as a vector instructions such as any of the instructions discussed above. The interconnect network 102 serves to interconnect each of the cores 101_1 to 101_N to each other as well as the other components 103, 104, 105. The last level caching system 103 serves as a last layer of cache in the processor 100 before instructions and/or data are evicted to system memory 108.

The memory controller 104 reads/writes data and instructions from/to system memory 108. The I/O hub 105 manages communication between the processor and "I/O" devices (e.g., non volatile storage devices (such as hard disk drive devices and/or non volatile memory devices) and/or network interfaces). Port 106 stems from the interconnection network 102 to link multiple processors so that systems having more than N cores can be realized. Graphics processing unit (GPU) 107 performs graphics computations. Power Management Unit 109 controls, often in cooperation with power management software, the power dissipation of the processor. Other functional blocks of significance (phase locked loop (PLL) circuitry, etc.) are not depicted in FIG. 1 for convenience.

FIGURES

The present invention is illustrated by way of example and not limitation in the figures of the accompanying drawings, in which like references indicate similar elements and in which.

DETAILED DESCRIPTION

Figure 2:
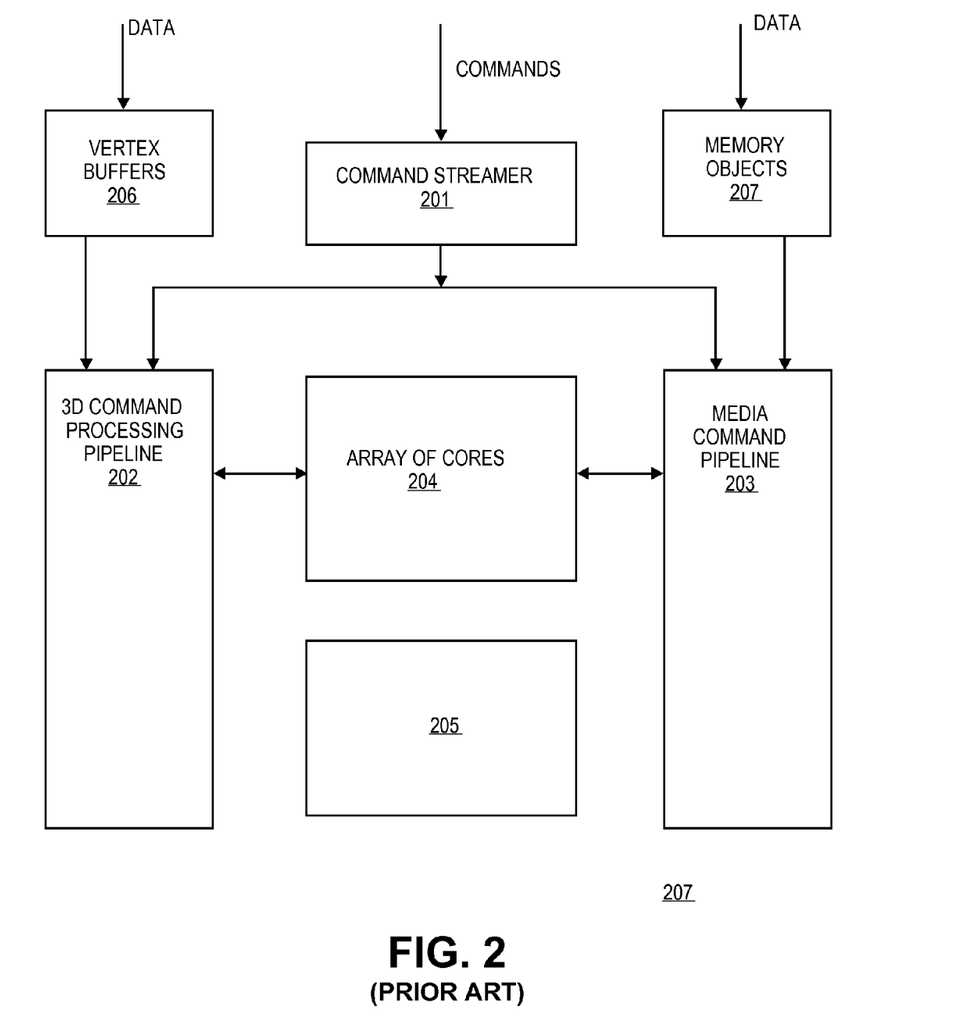
FIG. 2 shows an exemplary GPU architecture.

FIG. 2 shows an embodiment of a GPU 207. The particular GPU observed in FIG. 2 is only exemplary as other GPU architectures exist. As observed in FIG. 2 the graphics processor includes a command streamer 201 that receives commands from graphics processing software and issues the commands to the 3D pipeline 202 and media pipeline 203 as appropriate. The 3D pipeline 202 is a multistage pipeline that processes commands directed to rendering three-dimensional features. As such, the 3D pipeline 202 typically operates on vertex buffers 206. The media pipeline 203 is a multistage pipeline that processes commands directed to rendering media (e.g., a motion picture sequence). As such, the media pipeline typically operates on memory objects 207. Both pipelines 202, 203 rely on, e.g., for shading functions, an array of cores 204. The array of cores 204 essentially corresponds to a plurality of processing cores that execute snippets of program code as a service for one of the pipelines. Each of the cores may rely on any of accelerators 205 is executing its snippet of code. The array of cores typically accept a "source" surface as input data and write back a "destination" surface as a resultant.

An increasing problem is the complexity of attempting to intelligently manage the power consumption of a processor having a complex block of logic such as the GPU of FIG. 2.

Figure 3:
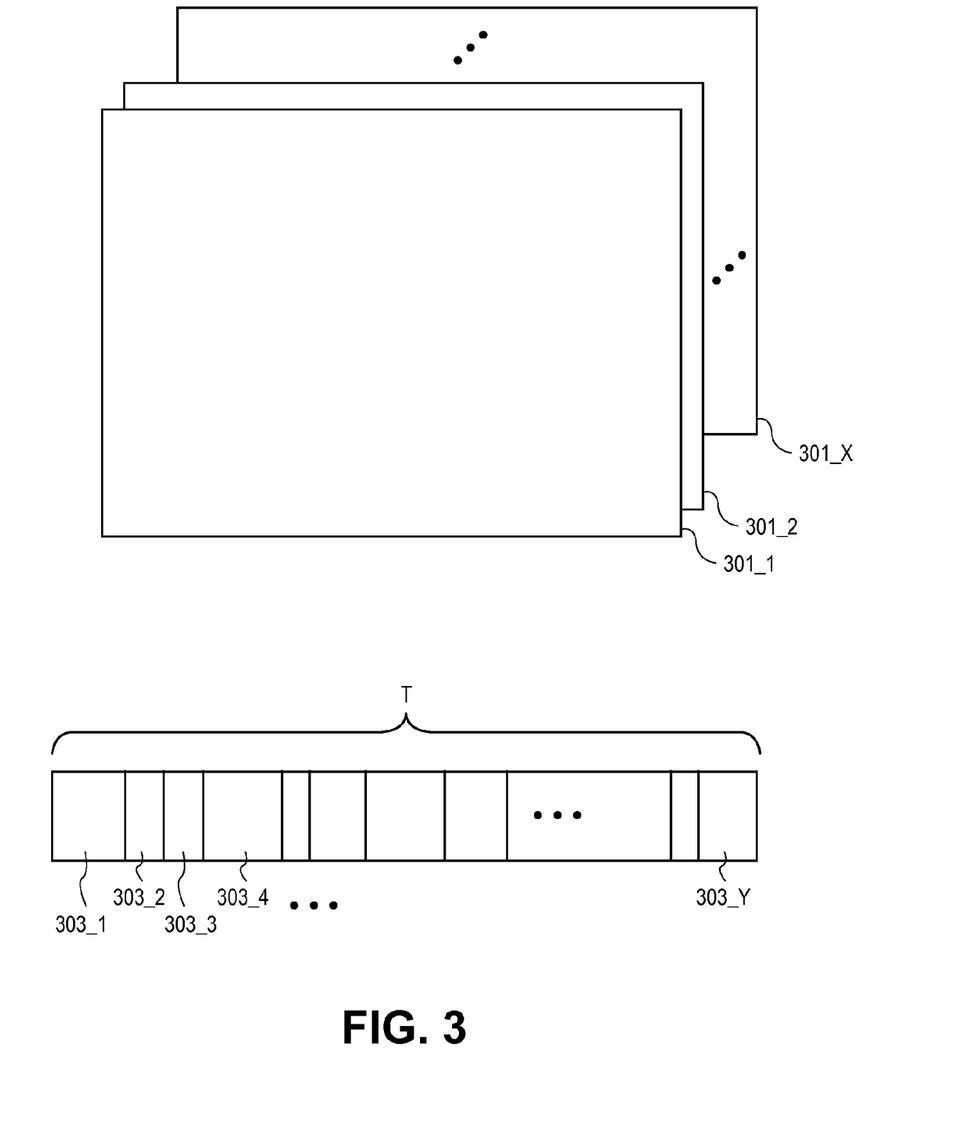
FIG. 3 shows the manner in which a GPU renders imagery on a display.

FIG. 3 shows a depiction of the manner in which a GPU renders visual display information for a computing system. As observed in FIG. 3, a typical GPU is designed to "draw" a series of frames 301 and present these frames to the display at a specific frame rate. Each individual frame 301_1, 301_2, ... 301_X corresponds to a different "picture" that is presented on the display. The succession of presentation of the individual frames 301_1, 301_2, ... 301_X at the frame rate presents the viewer of the display the image of motion where motion is desired and stability/stillness where the stability/stillness is needed. For example, if the desired depiction is a cartoon of an automobile moving from left to right against a blue background, each next frame will depict the automobile shifted to the right as compared to its immediately preceding frame against an unchanged blue background.

The techniques and mechanisms used to draw any single frame may vary from GPU architecture to GPU architecture. Regardless of any specific technique or mechanism, however, the drawing of each frame can be viewed as broken down into "phases". FIG. 3 also depicts this general concept. Here, time T corresponds to the amount of time it takes the GPU to draw a single frame. As observed in FIG. 3, the drawing of a single frame can be viewed as being accomplished by the GPU and surrounding computer system executing through a series of distinguishable machine phases 303_1, 303_2, ... 303_Y. In general, different parts of the GPU and computing system will be used at different time periods of the overall processing of a frame to generate a single frame. The use of a specific set of parts for some extended time period that is less than the total time period needed to draw the frame corresponds to a phase. Notably, certain phases are likely to re-appear or re-present themselves not only across a same frame but also across different frames of a same display sequence as well as across entirely different frame sequences. For example "phase A" might be recognizable within frames of two entirely different graphics processing applications (e.g., two completely different video games). In this sense, a phase represents a generic, granular state of a GPU.

As an example, referring to the GPU architecture of FIG. 2, in drawing a single frame, during a first phase 303_1, the GPU might spend an extended time period emphasizing specific functional units within a first of the GPU pipelines 202, 203, while, in another phase 303_2, the GPU might emphasize the use of different functional units within the other of the pipelines 202, 203. Further still, in yet another phase, the GPU as a whole might be quiet while it waits for more data and/or commands to be fetched from a memory sub-system. The specific GPU/system behavior that constitutes a particular phase is apt to be different across GPU/system architectures and those of ordinary skill will be able to identify appropriate frame drawing phases for their particular GPU/system architecture.

Figure 4:
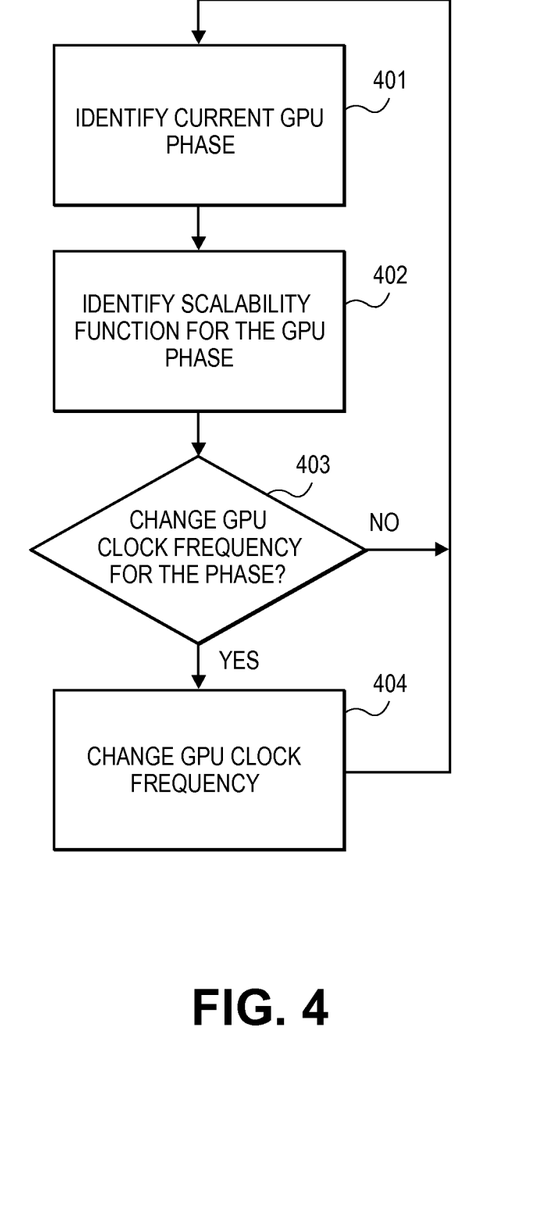
FIG. 4 shows a process for controlling the power consumption of the GPU.

FIG. 4 shows a process for controlling the power consumption of a GPU over the course of drawing a frame. As observed in FIG. 4, the phase that the GPU and/or surrounding computer system is in identified 401. Upon the current phase being identified, a scalability function for the phase is defined 402. A scalability function is essentially a characteristic feature of the phase that describes the degree to which the performance of the GPU will change if a certain state variable (e.g., clock speed) of the GPU changes. For simplicity the remainder of the document refers to frequency scalability. However, those of ordinary skill will recognize that other units of performance, such as the number of and/or specific types of logic/execution/functional units that are enabled, could also be modulated in accordance with the principles discussed herein to better control performance and power consumption.

As described in more detail below, the specific performance response of the GPU to a change in GPU clock speed can be dramatically different depending on what phase the GPU is in (and perhaps what frequency the GPU is operating at while in that phase). As such, process 402 provides power management functionality with information for determining what performance response the GPU will have if the GPU's current clock frequency is changed.

With the frequency scalability function for the present phase being obtained, a determination is made whether the clock frequency of the GPU should be changed 403. Here, as a power saving feature, if the frequency scalability function for the current phase indicates that the performance of the GPU is not apt to drop substantially if the GPU's clock is lowered, the power management function may decide to lower the GPU clock for the execution of this phase. Likewise, if the frequency scalability function for the current phase indicates that the performance of the GPU is apt to drop substantially, the power management function may choose not to lower the GPU clock for the current phase. If the power management function determines that the GPU clock should be lowered for this phase, the GPU clock frequency is lowered to a new value 404 and the process repeats upon detection of the next phase. If the power management function determines that the GPU clock should not be lowered for this phase the GPU clock remains unchanged and the process repeats upon detection of the next phase.

Figure 5:
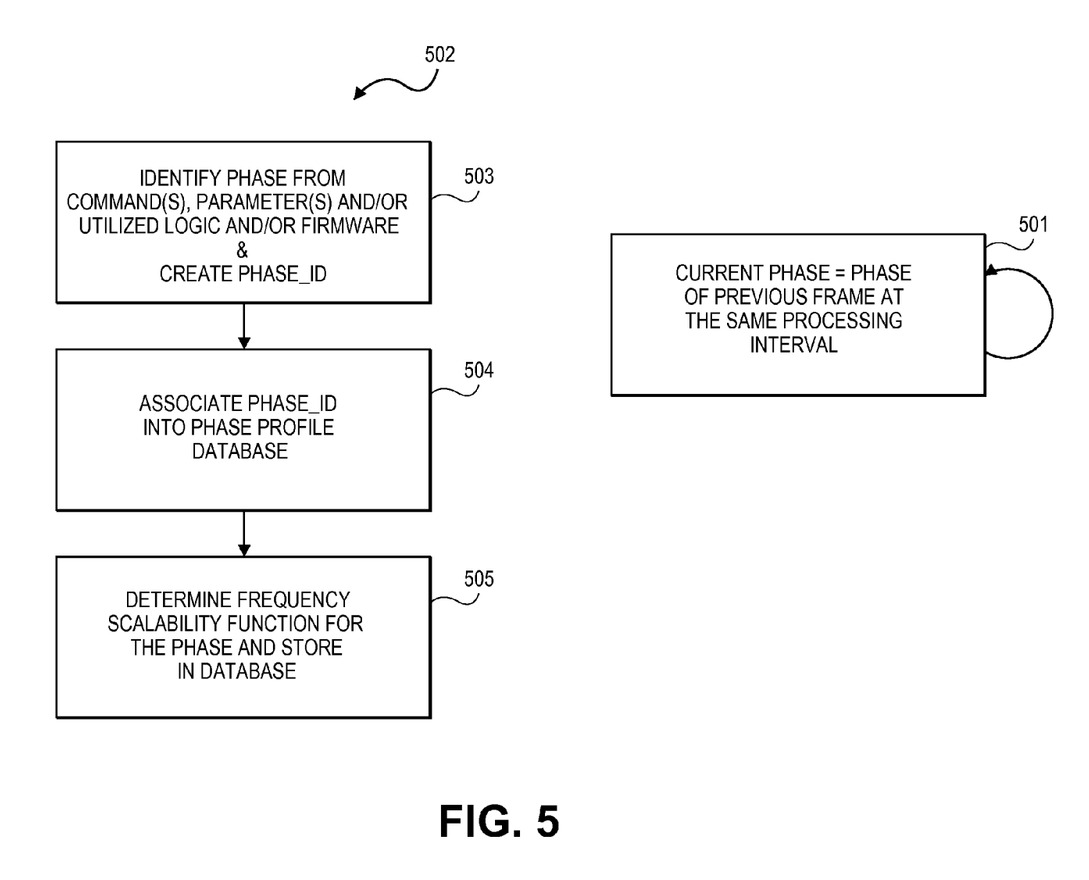
FIG. 5 shows a process for determining the current phase of the GPU.

FIG. 5 pertains to an embodiment for determining the GPU's current phase. According to the embodiment of FIG. 5, the current phase is simply selected to be the same phase in the same processing interval of the frame as the previous phase 501. This phase identification process relies on the property that frame content typically does not significantly change between immediately neighboring frames in the frame sequence. Of course, frame content can and often does change to some extent from frame to frame. As such, background process 502 monitors the architectural state of the GPU and/or surrounding processor and/or computing system while it is drawing a frame.

Background process 502 also can be viewed as corresponding to a process that is used to initially identify a particular phase prior to its initial execution, and, establish its frequency scalability information for subsequent executions of the phase after its initial execution.

A phase is initially identified by looking at one or more commands, their parameters, and associated utilized internal logic and/or firmware units (e.g., shaders and/or buffers (e.g., vertex buffer, constant buffer)). For example, a first phase may be identified from a draw command that utilizes a vertex buffer, a constant buffer and specific shaders. Likewise, a second phase may be identified from a render-pass command having a specific target surface size and associated format(s), etc. In an embodiment, a phase is identified prior to its initial execution. For example, the combination of characteristics used to identify the phase may be gleaned from studying the contents of a command buffer queue that queues command(s) that have not yet executed. Phases may even be identified pre-runtime (such as basic combination sets previously identified by the GPU manufacturer and/or GPU program code supplier).

A phase ID is created for each identified phase. Thus, a phase ID is created for a distinctive recognized combination of what the GPU is doing and what parts of the GPU and/or its surroundings are being used to do it 503. In an embodiment, the specific alphanumeric and/or other character set used to articulate a phase_ID is directly derived from the specific command(s), parameters, utilized logic/firmware units, etc. combination that defines its corresponding phase.

A "phase profile database" is used to keep track of which phases the GPU is operating within during specific frame processing intervals as well as keep track of the frequency scalability information for each particular phase. Here, the phase_ID of any newly recognized phase is entered or otherwise associated into the phase profile database 504.

The phase_ID of the newly recognized phase may be the same as, or sufficiently close to, an existing phase_ID that has already been associated in the phase profile database or, if not, be associated into the phase profile database in its own right. The phase_IDs that have already been entered in the phase profile database may have been entered pre-runtime (e.g., through firmware by the GPU manufacturer and/or GPU code provider) and/or may correspond to previously identified phases of the code that is currently executing on the GPU. In an embodiment, if the phase ID of the newly recognized phase matches a phase_ID that has already been associated into the phase profile database, a "decision tree" for the phase (described further below) may be loaded from the phase profile database into the GPU just before the phase actually executes.

When the newly recognized phase finally executes for the first time, statistics are collected for the phase and a frequency scalability function for the phase is determined 505. The frequency scalability function is then kept in the phase profile database so that it is correlated to the phase_ID of the phase. In an embodiment, the frequency scalability information is kept in a hash structure that is accessed by taking a hash of the phase_ID for the phase.

Thus, for immediately following drawn frames, referring back to process 501, process 501 specifically refers to the phase profile database to identify which phase the frame is within while it is being drawn. Notably, process 502 builds the database that identifies which phases are in play at which specific intervals of the frame's overall processing as well as their corresponding frequency scalability information.

Process 502, however, can identify frame to frame changes in phase and cause the GPU phase identification process to adjust accordingly on the immediately following frame after the phase change was flagged. For example, a frame might dramatically change its content from a first frame to a second frame. The first frame will be drawn according to the phases of the frame immediately prior to the first frame (owing to process 501). However, during the processing of the first frame, process 502 will flag any phase changes at a particular frame processing interval resulting from the dramatic change in frame content and store these changes to the data store. Power management logic, through process 501 and its referral to the data store, will apply the phase change to the processing of the second frame. Power management logic can also perform process 502 and implement the data store which may be built into system memory or internal memory cells of the power management logic.

Figure 6:
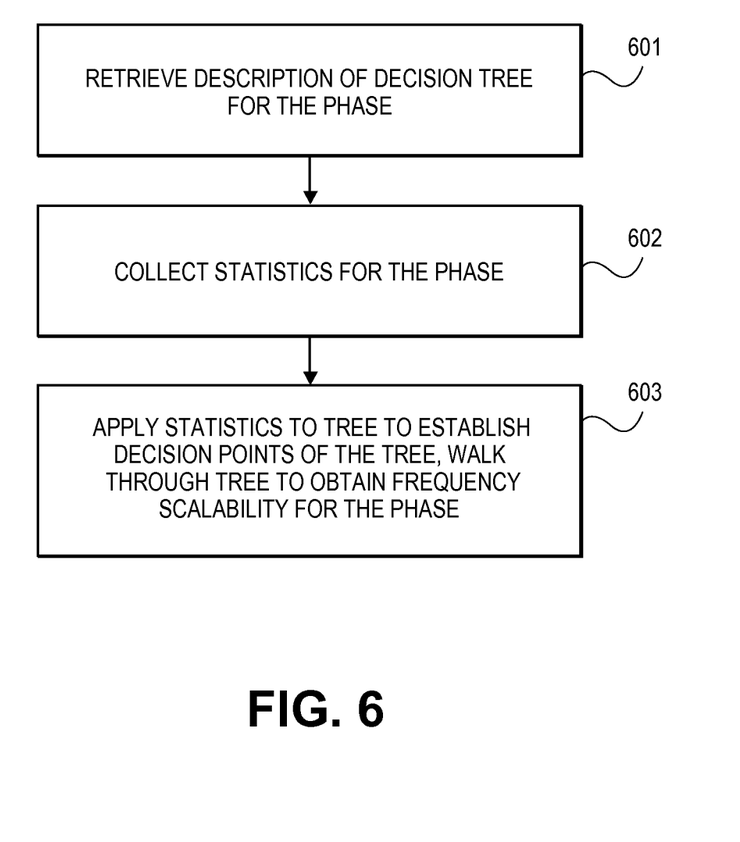
FIG. 6 shows a process for determining the frequency scalability for a GPU within a particular phase.

FIG. 6 shows an embodiment of a methodology for determining the frequency scalability information of a phase. That is, FIG. 6 can be viewed as more detailed depiction of an embodiment of process 505 of FIG. 5. Recall from the discussion of FIG. 5 that a "decision tree" can be identified for a particular phase. In the case where the phase_ID of a newly identified phase in the command sequence matches a previously identified phase_ID, the decision tree for the phase_ID in the phase profile database can be used (elsewise, a default or "best guess" decision tree can be used).

As observed in FIG. 6, a description of a decision tree for the phase is retrieved 601 and statistics for the phase are collected over the early processing sequences of the phase 602. The decision tree, in an embodiment, is determined pre-runtime, loaded into a data store (e.g., BIOS firmware) and made available to the power management logic. When the phase identification process (e.g., process 501 of FIG. 5) indicates that a new phase has just started, power management logic retrieves a description of the decision tree for the phase from the data store and configures (e.g., enable, reset to zero, etc.) statistics collecting counters (as one example) within the GPU and system hardware that are pertinent to the particular decision tree for the new phase. Here, the retrieved decision tree description can also have appended meta data that indicates which counters (or other statistics tracking circuits) are pertinent to the particular decision tree. Although in some embodiments statistics may be kept only with counters, conceivably, other statistics related circuits may be implicated such as voltage, current and/or temperature monitors.

In an embodiment, statistics are collected over most if not all of the entirety of the first execution of a newly recognized phase (e.g., counters count up and/or down). The tracked statistics are input to appropriate nodes of the decision tree and the decision tree is "walked through" against the statistical input to resolve to a particular end point leaf node of the tree 603. The particular end point leaf node that is resolved to corresponds, ideally, to a frequency scalability parameter or function that indicates how responsive the GPU's performance will be (for the particular phase in question) in response to a change in GPU frequency. An exemplary decision tree and how the statistics effect which end point leaf node is ultimately resolved to is discussed further below with respect to FIG. 8. The frequency scalability parameter is then stored in the profile database and recalled for each subsequent execution of the phase.

An embodiment may also update the stored data in the profile database with data collected in a subsequent execution of an already identified phase.

FIG. 4 essentially shows the process for subsequent executions of the phase. As observed in FIG. 4, the phase is first identified 401 (e.g., using process 501 of FIG. 5) and the frequency scalability information for the phase is extracted 402 from the phase profile datastore using the phase_ID of the phase.

Figure 7:
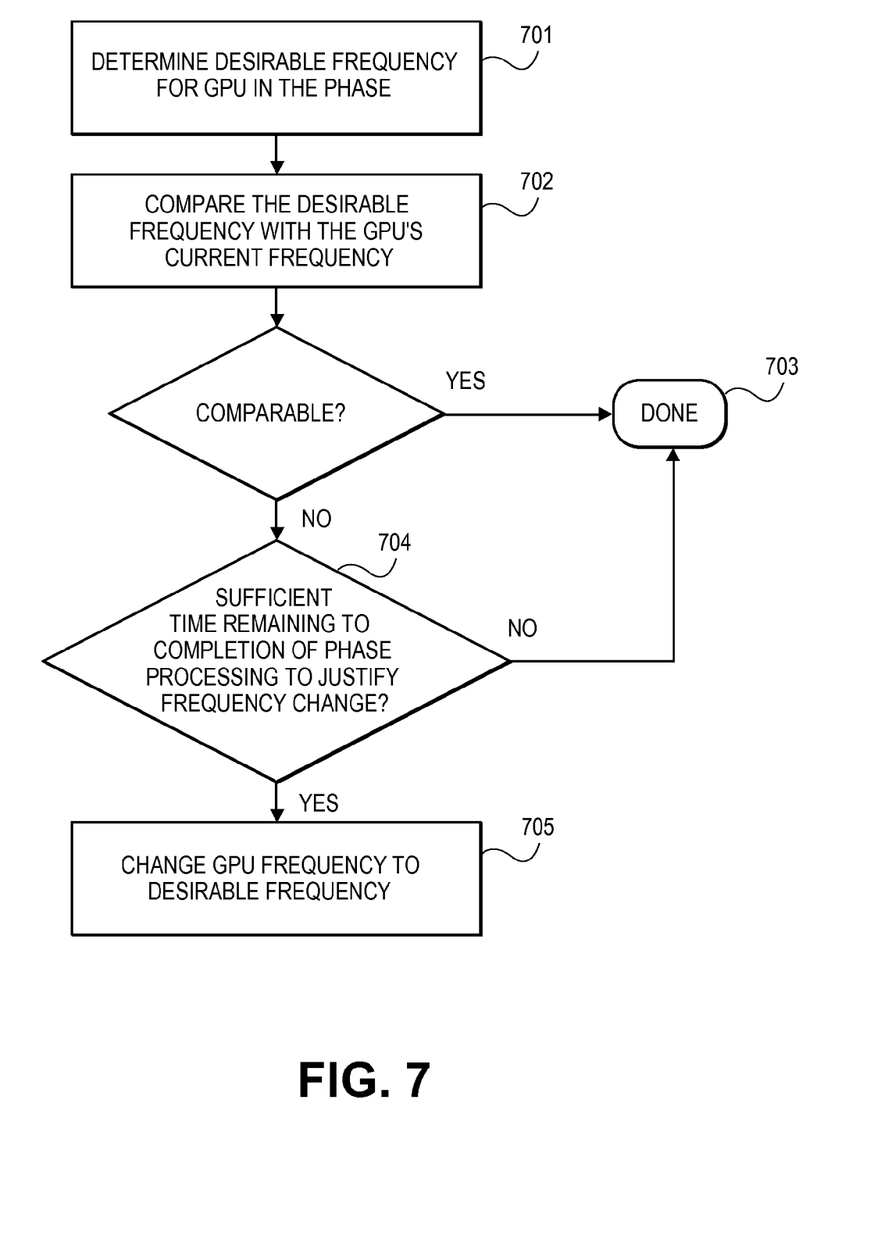
FIG. 7 shows a process for determining whether the frequency of a GPU within a particular phase should be changed.

Once the frequency scalability for the phase is determined 402 a decision is made as to whether the frequency of the GPU should be changed or not for the newly entered phase 403. FIG. 7 shows an embodiment of the process 700 for deciding whether the frequency of the GPU should be changed for the execution of the current phase. First, a desirable or optimal frequency of operation for the current phase is determined from the just determined scalability parameter/function for the current phase 701. Here, in an embodiment, the decision to change the frequency is a made at the beginning of the phase and lasts for the entirety of the phase (the length of the phase also being kept in the phase profile data store. Here, the phase "inherits" the frequency setting of its immediately preceding phase. Thus the decision is whether this inherited frequency should be changed. A discussion of how a desirable or optimal frequency for the current phase can be determined is also provided further below with respect to FIG. 8. In general, however, as a power saving feature, the desirable or optimal frequency of the GPU for the current phase will correspond to the lowest frequency that can be applied to the GPU without a dramatic reduction of "fall off" in performance of the GPU.

The desirable or optimal frequency of the GPU is then compared with the GPU's current frequency 702. The GPU's current frequency is the GPU frequency that was used to process the immediately preceding phase. If the current frequency is sufficiently close to the desirable or optimal frequency (e.g., within some preset range arrange about the optimal frequency), the process if complete 703. Here, the power cost of changing the frequency is not worth the effort. However, if the current frequency is not sufficiently close to the desirable or optimal frequency, in an embodiment a determination is made as to whether it makes sense to change the GPU frequency given the amount of processing that remains to execute the current phase 704. Here, recall that the profile data referred to by process 501 of FIG. 5 not only identifies what the current phase is but also the extent of the phase (in terms of time, surface area, or both). This information is referred to after comparison 702 indicates the frequency should be changed to understand how much processing is expected for the phase and whether the cost of changing GPU frequency (in terms of lost GPU performance over the course of the change) is too high to implement the change. In this case, the frequency is changed 705 to the desirable/optimal frequency for the phase.

Figure 8:
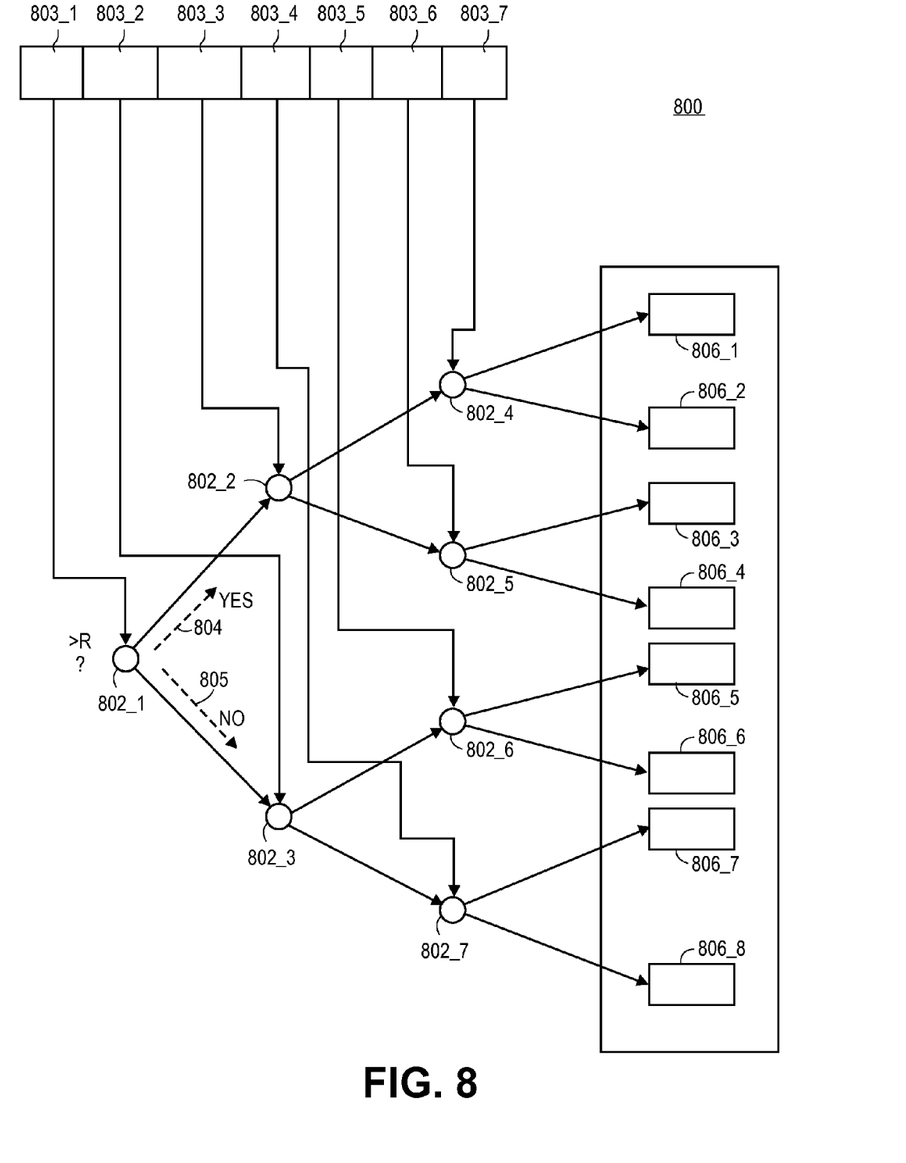
FIG. 8 shows an embodiment of a decision tree.

FIG. 8 shows an embodiment of a decision tree 800. Referring to the decision tree 800, seven decision nodes 802_1-801_7 are observed in the tree. Moreover, a statistics counter 803_1 through 803_7 effectively feeds each decision node in the tree. Each node directs a flow through the tree based on its respective counter value. For example, the first node 802_1 will direct the decision flow up along path 804 if the value of counter 803_1 is greater than R, or, along path 805 if the value of counter 803_1 is less than or equal to R. Here, ">R?" (as well as the other specific decision points in the tree) is embedded on the description of the decision tree that, as described above, is determined pre-runtime and fetched in response to the determination of the current phase. Each of decision nodes 802_2 through 802_7 operate similarly. Eventually one of the end point leaf nodes 806_1 through 806_8 is reached.

In practice, the number of levels in the decision tree should be kept relatively small (the exemplary decision tree of FIG. 8 shows three decision levels) so that the time spent processing the tree to reach an end point leaf node is reduced/minimized. In an embodiment, power management logic determines the correct branch to take at each node.

If the tree walking is implemented in software, program code is executed to perform the walking algorithm described above. Here, the input counter values for the decision tree are presented in register space of the processor which the software reads to apply the values to the decision tree. A description of the tree structure (the specific network of coupled decision nodes) provided in the fetched tree structure profile is also utilized by the software to build the tree in a software environment.

If the decision tree is implemented in hardware, each node in FIG. 8 may correspond to a comparator circuit. Hardware counter values are fed to their respective comparator as are the specific decision point value from the fetched decision tree description. Moreover, registers (not shown) may hold the specific decision tree decision values (e.g., R as discussed above) that are also routed to the correct decision tree node. Here a switching network (not shown) may be present between a bank of comparators and the counter values so that any counter value can be routed to any node. The network may be designed so that more than one route may stem from any counter so that any one counter value can be routed to more than one node in the decision tree. Moreover, networking circuitry may also reside between nodes so that different tree structures, e.g., a logical node that has three output paths rather the only two may be configured. Here, the fetched decision tree description may contain network configuration information to configure the network(s) so that logic circuitry of the processor can configure the one or more networks to implement the appropriate tree structure and correct connections between the comparators, counter value registers and decision value registers.

Each of the eight leaf nodes 806_1 through 806_8 corresponds to a different frequency scalability curve for the particular phase that the decision tree corresponds to. Depending on implementation, the actual information retrieved from a leaf node may simply be a scalar that represents overall GPU performance responsiveness to a frequency change, or, may include a set of coefficients for inclusion in a (e.g., Taylor) numerical series approximation of an actual scalability curve. These are just two examples of possible end point leaf node content. Other forms may also be used.

Figure 9:
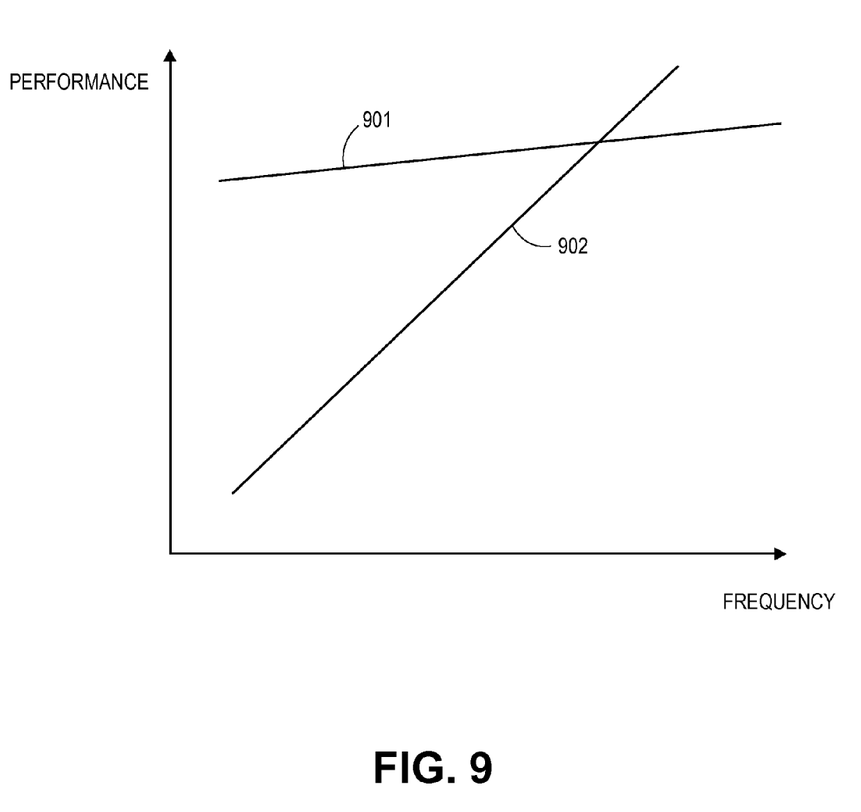
FIG. 9 shows exemplary frequency scalability curves.

FIG. 9 shows two, extreme exemplary scalability curves for a particular phase. Here, scalability curve 901 represents GPU performance that is least responsive to a change in current frequency and scalability curve 902 represents GPU performance that is most responsive to a change in current frequency. Various decision trees may be structured (but are not required to be structured) such that the two extreme performance responses for a same GPU phase are represented by end point leaf nodes on the far most edges of the tree's leaf nodes. For example, curve 901 may correspond to leaf node 806_1 and curve 902 may correspond to leaf node 806_8.

As an example, consider a decision tree that is fed with statistics counters that measure the state (number of pending requests) of the GPU's internal caches and data/instruction buffers and the state of system memory's internal caches and data/instruction buffers. In the basic case where the GPU's internal caches/buffers are full but system memory's internal caches/buffers are empty, GPU performance should be responsive to a change in GPU frequency because increasing the GPU clock would enable the GPU to "crunch" through its back-logged caches/buffers at a faster pace. That is, the "bottleneck" is within the GPU. Thus, statics counters that indicate this situation may cause the decision tree walk through to reach leaf node 806_2 which corresponds to scalability curve 902.

If the statistics counters indicated the reverse situation, that the GPU's internal caches/buffers were empty and system memory's internal caches/buffers were full, increasing GPU clock speed is not apt to increase GPU performance too much as the bottleneck resides outside the GPU at system memory. As such, statistics counters indicating empty GPU internal caches/buffers and fully loaded system memory caches/buffers might cause the decision tree walk through to reach leaf node 806_1 which corresponds to scalability curve 901.

In the context of power savings, rather than asking whether GPU clock frequency should be increased, in an embodiment, the question is instead asked whether it is OK to reduce the GPU frequency. Here, the later situation discussed just above, where the bottleneck is outside the GPU and the corresponding scalability curve 901 does not show strong dependence on GPU performance with GPU frequency, lowering the GPU clock frequency makes sense. As such, when the decision tree walk through yields a scalability curve that does not demonstrate a strong relationship between GPU performance and GPU frequency, the power management function may choose to lower the GPU frequency because so doing will lower GPU power consumption without sacrificing much in the way of GPU performance.

Notably, a GPU's actual current performance dependency on frequency may be a function of its current frequency. For example, a GPU that is currently operating at a lower frequency may exhibit a stronger performance response to a change in its frequency than a GPU that is currently operating at a higher frequency. As such, the GPU's current frequency may also be an input parameter to the decision tree. In this case, identification of the current phase may yield only a single decision tree (one tree per for each identifiable phase) that is suitable for any range of current GPU frequency. Alternatively, each identifiable GPU phase may have its own "set" of decision trees, where each tree in the set corresponds to a different current frequency of the GPU (e.g., a first tree is to be used when the GPU is operating at lower frequencies, and, a second tree is to be used when the GPU is operating at higher frequencies). In this case, the current GPU frequency and the identified GPU phase are together used an input criteria to select the correct tree description.

Although the above teachings have stressed lowering GPU frequency, frequency scalability information could also be used to raise the GPU's clock speed if the scalability information indicates a sufficiently strong GPU performance response to such an increase. For example, the processor or its corresponding computer system may be in a selectable "performance mode" rather than a selectable "power savings mode". As such, the system chooses to increase GPU speed when so doing will sufficiently boost GPU performance.

Figure 10:
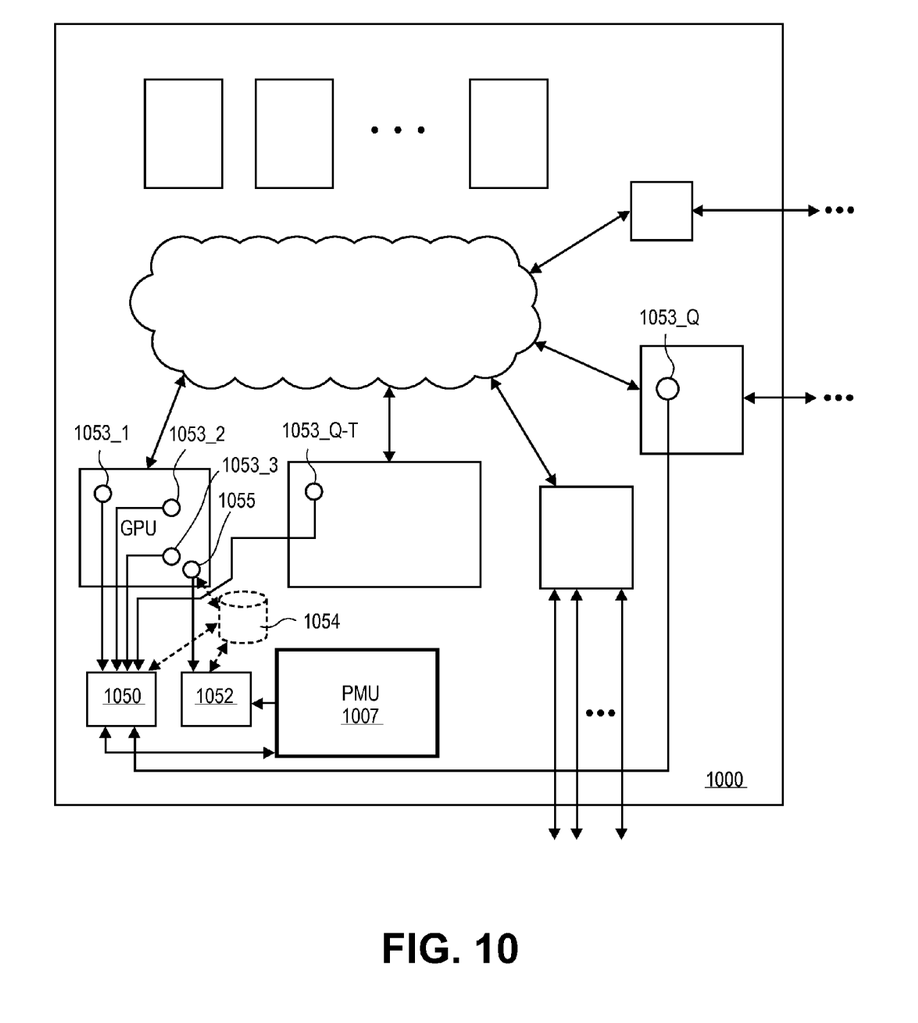
FIG. 10 shows a processor having improvements.

FIG. 10 shows an improved processor 1000 that is enhanced to incorporate the improvements discussed above. Unlabeled components are recognizable via comparison with FIG. 1. At one extreme, most all of the power management intelligence is implemented with software that runs on one or more of the processing cores the processor (and/or, conceivably, another processor that is responsible for power management decisions of a larger multi-processor system that the processor is just a part of). In this case, the processor may include first register space 1052 for reporting GPU architectural state information to the power management logic software so that the software can determine which phase the GPU is current in. Register space 1052 is coupled to GPU architectural state monitoring circuitry 1055. Other architectural state monitoring circuitry (not shown) may also be coupled to register space 1052 (e.g., memory controller monitoring circuitry, processing core monitoring circuitry, etc.). Here, the information that correlates GPU and/or system architectural state to a specific GPU phase may be loaded into system memory from firmware BIOS, just reside in firmware BIOS. Likewise, counters and other statistics tracking circuits 1053_1 through 1053_Q within the GPU as well as outside the GPU are coupled to second register space 1050 that the power management logic software reads in order to build and walk through the decision tree. Again, the decision tree information may be loaded in system memory or firmware BIOS. Should the power management software decide to lower the GPU clock frequency for the current phase, other register space of the processor will be written to by the software that sets the GPU clock speed.

At the other extreme, most all the power management intelligence is implemented in hardware in the processor. In this case, circuitry 1052 corresponds to dedicated logic circuitry that performs the phase identification task. Here, circuitry 1052 should be coupled to a data store such as data store 1054 implemented as register space and/or a portion of memory on board the processor that contains the information used to identify which phase the GPU is in based on the reported GPU architectural state. Likewise, circuitry 1050 is also implemented as dedicated logic circuitry that implements the decision tree and performs the decision tree walk through processing. As such, circuitry 1050 may be implemented according to any of the specifics discussed above with respect to FIG. 8. Moreover, circuitry 1050 may also be coupled to a data store 1054 that contains the decision tree structure and decision point description information. Circuits 1050, 1052 may be embedded in the power management unit 1007 or elsewhere. Circuits 1050, 1052 may be implemented as custom logic circuits, or, as one or more micro-controllers or some other circuit that performs its respective processes by executing program code.

Variations between these two approaches are also possible where various aspects of the complete solution are performed in software and other aspects are performed in hardware (e.g., phase identification is performed in hardware and decision tree implementation is performed in software).

As any of the processes taught by the discussion above may be performed with software, such processes may be implemented with program code such as machine-executable instructions that cause a machine (such as a processor) that executes these instructions to perform certain functions. Processes taught by the discussion above may also be performed by (in the alternative to the execution of program code or in combination with the execution of program code) by electronic circuitry designed to perform the processes (or a portion thereof).

It is believed that processes taught by the discussion above may also be described in source level program code in various object-orientated or non-object-orientated computer programming languages. An article of manufacture may be used to store program code. An article of manufacture that stores program code may be embodied as, but is not limited to, one or more memories (e.g., one or more flash memories, random access memories (static, dynamic or other)), optical disks, CD-ROMs, DVD ROMs, EPROMs, EEPROMs, magnetic or optical cards or other type of machine-readable media suitable for storing electronic instructions. Program code may also be downloaded from a remote computer (e.g., a server) to a requesting computer (e.g., a client) by way of data signals embodied in a propagation medium (e.g., via a communication link (e.g., a network connection)).

In the foregoing specification, the invention has been described with reference to specific exemplary embodiments thereof. It will, however, be evident that various modifications and changes may be made thereto without departing from the broader spirit and scope of the invention as set forth in the appended claims. The specification and drawings are, accordingly, to be regarded in an illustrative rather than a restrictive sense.

The invention claimed is:

1. A method performed by a processor comprising:
   identifying a plurality of graphics processing unit (GPU) phases of a frame;
   defining a frequency scalability function of performance versus frequency for each of said plurality of identified GPU phases;
   separately tracking frequency scalability information for each GPU phase of the plurality of GPU phases in a phase profile database; and
   determining whether to change a frequency at which a GPU is to draw said frame within said plurality of identified GPU phases based on said frequency scalability functions.

2. The method of claim 1 further comprising changing the frequency.

3. The method of claim 2 wherein said changing the frequency is raising the frequency.

4. The method of claim 2 wherein the changing the frequency is lowering the frequency.

5. The method of claim 1 further comprising determining whether to change the frequency for a GPU phase based on an amount of time that remains to complete execution of the GPU phase.

6. The method of claim 1 further comprising:
   building a decision tree from the frequency scalability functions of said GPU; and
   walking through said decision tree to determine said GPU's performance response to a frequency change within a GPU phase of the frame.

7. The method of claim 6 further comprising lowering said GPU's frequency if said GPU's performance does not exceed a performance threshold in response to the frequency change.

8. The method of claim 6 further comprising raising said GPU's frequency if said GPU's performance exceeds a performance threshold in response to the frequency change.

9. A processor comprising:
   a graphics processing unit (GPU) to draw a frame; and
   circuitry to:
   identify a plurality of GPU phases of the frame,
   define a frequency scalability function of performance versus frequency for each of said plurality of identified GPU phases, and
   determine whether to change a frequency at which said GPU is to draw said frame within said plurality of identified GPU phases based on said frequency scalability functions, wherein the circuitry is to separately track frequency scalability information for each GPU phase of the plurality of GPU phases in a phase profile database.

10. The processor of claim 9 further comprising a data store to store information that correlates said GPU's architectural state to pre-runtime determined phases of said GPU.

11. The processor of claim 9 further comprising a data store to store information describing a decision tree for said frequency scalability functions.

12. The processor of claim 11 further comprising statistics tracking circuitry to present statistics of said GPU for said decision tree.

13. The processor of claim 10 further comprising a second data store to store information describing a decision tree for said frequency scalability functions.

14. The processor of claim 13 further comprising statistics tracking circuitry to present statistics of said GPU for said decision tree.

15. The processor of claim 9 wherein the circuitry is to determine whether to change the frequency for a GPU phase based on an amount of time that remains to complete execution of the GPU phase.

16. A non-transitory machine readable medium containing program code that when processed by a computing system causes said computing system to perform the following:
    identifying a plurality of graphics processing unit (GPU) phases of a frame;
    defining a frequency scalability function of performance versus frequency for each of said plurality of identified GPU phases;
    separately tracking frequency scalability information for each GPU phase of the plurality of GPU phases in a phase profile database; and
    determining whether to change a frequency at which a GPU is to draw said frame within said plurality of identified GPU phases based on said frequency scalability functions.

17. The non-transitory machine readable medium of claim 16 wherein said program code when executed causes said computing system to change said frequency.

18. The non-transitory machine readable medium of claim 17 wherein said program code when executed causes said computing system to one of raise and lower said frequency.

19. The non-transitory machine readable medium of claim 16 wherein said program code causes said computing system to:
    build a decision tree from said frequency scalability functions of said GPU; and
    walk through said decision tree to determine said GPU's performance response to a frequency change within a GPU phase of the frame.

20. The non-transitory machine readable medium of claim 16 wherein said program code when executed causes said computing system to determine whether to change the frequency for a GPU phase based on an amount of time that remains to complete execution of the GPU phase.

21. A processor comprising:
    circuitry to:
    identify a plurality of machine phases of a frame;
    obtain a scalability function for each of said plurality of identified machine phases, each of said scalability functions describing said processor's performance versus a configurable parameter of said processor; and
    determine whether to change said configurable parameter for said machine phase based on said scalability functions, wherein the circuitry is to separately track configurable parameter scalability information for each machine phase of the plurality of machine phases in a phase profile database.

22. The processor of claim 21, wherein the circuitry is to determine whether to change the configurable parameter for the machine phase based on an amount of time that remains to complete execution of the machine phase.

* * * * *